US008233894B2

(12) United States Patent
Vishwanathan et al.

(10) Patent No.: US 8,233,894 B2
(45) Date of Patent: Jul. 31, 2012

(54) SYSTEM AND METHOD FOR SENDING MOBILE MEDIA CONTENT TO ANOTHER MOBILE DEVICE USER

(75) Inventors: Kumar K. Vishwanathan, Windham, NH (US); Prakash R. Iyer, North Andover, MA (US); Rangamani Sundar, Windham, NH (US); James A. Goldstein, Weston, MA (US)

(73) Assignee: Resource Consortium Limited, Tortola (VG)

( * ) Notice: Subject to any disclaimer, the term of this patent is extended or adjusted under 35 U.S.C. 154(b) by 1355 days.

(21) Appl. No.: 11/843,702

(22) Filed: Aug. 23, 2007

(65) Prior Publication Data
US 2008/0051071 A1    Feb. 28, 2008

Related U.S. Application Data

(60) Provisional application No. 60/839,423, filed on Aug. 23, 2006.

(51) Int. Cl.
*H04M 3/00* (2006.01)
(52) U.S. Cl. .................................... 455/419; 455/414.1
(58) Field of Classification Search ............... 455/401, 455/414.1, 419
See application file for complete search history.

(56) References Cited

U.S. PATENT DOCUMENTS

| | | | |
|---|---|---|---|
| 5,751,707 A | 5/1998 | Voit et al. | |
| 6,363,357 B1 | 3/2002 | Rosenberg et al. | |
| 6,807,529 B2 | 10/2004 | Johnson et al. | |
| 6,912,581 B2 | 6/2005 | Johnson et al. | |
| 6,980,870 B1 * | 12/2005 | Mok et al. ....................... | 700/90 |
| 6,996,394 B2 | 2/2006 | Minear et al. | |
| 2001/0041561 A1 | 11/2001 | Ventulett et al. | |
| 2004/0066920 A1 * | 4/2004 | Vandermeijden .......... | 379/88.19 |
| 2005/0031097 A1 | 2/2005 | Rabenko et al. | |
| 2005/0166056 A1 | 7/2005 | Yamanaka | |
| 2005/0289630 A1 | 12/2005 | Andrews et al. | |
| 2007/0047523 A1 * | 3/2007 | Jiang ............................. | 370/352 |
| 2007/0266099 A1 * | 11/2007 | Wang et al. ................... | 709/206 |

* cited by examiner

*Primary Examiner* — Steven Lim
(74) *Attorney, Agent, or Firm* — Carlineo, Spicer & Kee, LLC (57) ABSTRACT

Techniques are provided that extend the capabilities of mobile phone devices to automatically assign media content items to "contacts" list entries. Thus, if a mobile device user indicates the desire to purchase a media content item to be assigned to or associated with another mobile device user (e.g., an entry in a contacts list), the experience of acquiring that media content item and making the assignment can be seamless reducing the number of tedious manual steps to accomplish that task.

25 Claims, 10 Drawing Sheets

SYSTEM AND METHOD FOR SENDING MOBILE MEDIA CONTENT TO ANOTHER MOBILE DEVICE USER

RELATED APPLICATION

This application claims priority to U.S. Provisional Application No. 60/839,423, filed Aug. 23, 2006, the entirety of which is incorporated herein by reference.

FIELD OF THE INVENTION

The present invention is directed to mobile communication devices and services.

BACKGROUND OF THE INVENTION

Mobile communication devices, e.g. cellular phones, are becoming more data centric and less voice centric and the modern mobile lifestyle is changing rapidly. Indeed, in many countries, the mobile phone is the "primary screen" in the household instead of a laptop or desktop computer.

Ring tones are a very popular way for mobile users to personalize their mobile phone experience. Ring tones are typically downloaded onto a mobile phone device and then used to alert the user of an incoming call. Mobile phone devices and operators also provide a number of default ring tones with the mobile phone when it is delivered to the user.

There are a number of ways a mobile user can download a ring tone to obtain access to tones other than those already stored in the device, such as:

1. Browsing an available catalog of ring tones from the mobile phone device and purchase rights to the ring tone;
2. Browsing an available catalog on the Internet and buy the ring tone;
3. Send a message, usually short messaging service (SMS) message, from the phone with pre-defined content;
4. Create a custom ring tone, e.g. on a PC, and download it, e.g. using a cable, to the mobile phone device; and The ring tones marketing techniques described above involve transmitting the ring tone to the mobile device as a link in a message, again typically in a SMS message. The user downloads and installs the ring tone executable. The user can then assign the ring tone in a variety of ways, such as:

1. Assign default ring tone for all incoming calls;
2. Assign ring tone to a specific category of calls, i.e. business, personal, VIP etc. In this case, if the calling party is assigned to a specific category, the ring tone associated with that category will be activated on the mobile phone device.
3. Assign ring tone to specific person in the address book. In this case, the specific ring tone is activated whenever a call is received from the specific person.

Ring tones are used by mobile device user to notify/alert him/her of an incoming call from a particular party, an incoming message from a particular party, a voice mail message has been left and is waiting for retrieval, a video mail message has been received (and from a particular party), etc.

Currently, the purchasing and assignment of a ring tone requires execution of two manual and distinct steps. If a mobile device user wishes to purchase rights to a ring tone for another mobile device user (i.e., gift), there is no easy mechanism by which the gifting mobile device user can ensure that the other mobile device user will actually hear/use the ring tone.

SUMMARY OF THE INVENTION

Techniques are provided that extend the capabilities of mobile phone devices to automatically associate media content items (also referred to as media assets) to "contacts" list entries. Thus, if a mobile device user indicates the desire to purchase a media content item to be assigned to or associated with another mobile device user (e.g., an entry in a contacts list), the experience of acquiring that media content item and making the assignment can be seamless reducing the number of tedious manual steps to accomplish that task.

The methods described herein are applicable to any media content, of which a ring tone is only an example. Other examples of media content for which these techniques can be used include (without limitation): digital images (e.g., "wall paper", "photographs"), video (with or without accompanying audio) and audio. Moreover, these media content items may be activated in a mobile device upon a variety of incoming communication contacts including, but not limited to: a voice call, a text message, a video mail message, and an email message.

Briefly, a system and method are provided for delivering media content to a mobile communication device. At a first mobile device, a user selects a media content item for use on a second mobile device upon the second mobile device receiving a communication contact from the first mobile device. At the second mobile device, the communication contact from the first mobile device is received together with information identifying the selected media content item. The second mobile device either automatically (without user action at the second mobile device) or after prompting the user of the second mobile device associates the selected media content item with an identifier of said first mobile device so as to activate the selected media content item upon receiving a communication contact from the first mobile device thereafter.

Objects and advantages of the techniques described herein will become more readily apparent when reference is made to the following description taken in conjunction with the accompanying drawings.

DETAILED DESCRIPTION

The present invention is directed to a system and methods to enable mobile device users to send and suggest media content to each other. The media content items may be used as alerts when receiving a communication contact from a particular mobile device user, or may be used more generally for other purposes if sufficient rights to the media content are purchased, as will become apparent hereinafter. When a mobile device user indicates the desire to purchase a media content item to be assigned to or associated with another mobile device user (e.g., an entry in a contacts list), the experience of acquiring that media content item and making the assignment can be seamless reducing the number of tedious manual steps to accomplish that task.

Figure 1:
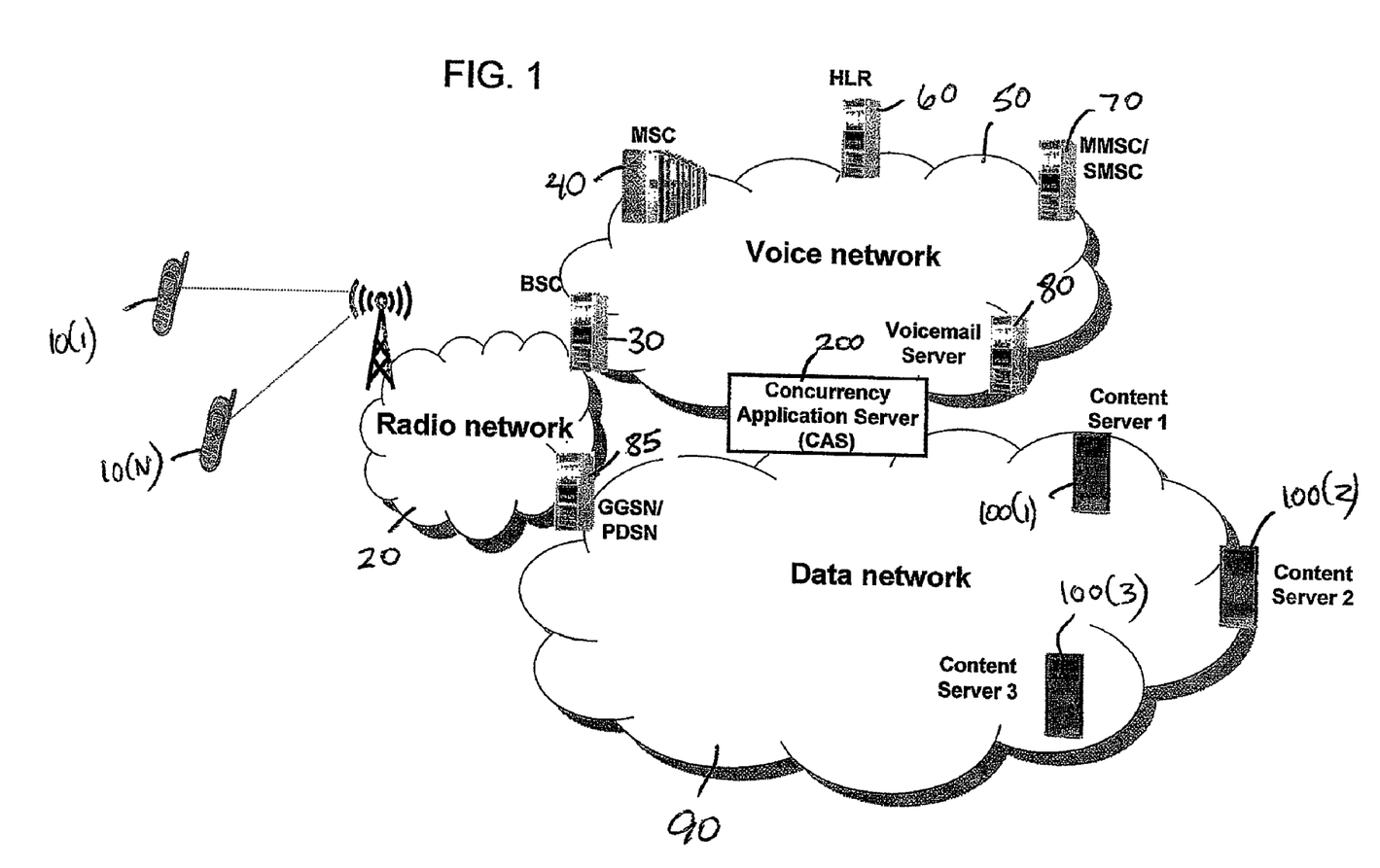
FIG. 1 is a high level block diagram showing a mobile communication system that is enhanced according to the techniques of the invention.
Figure 2:
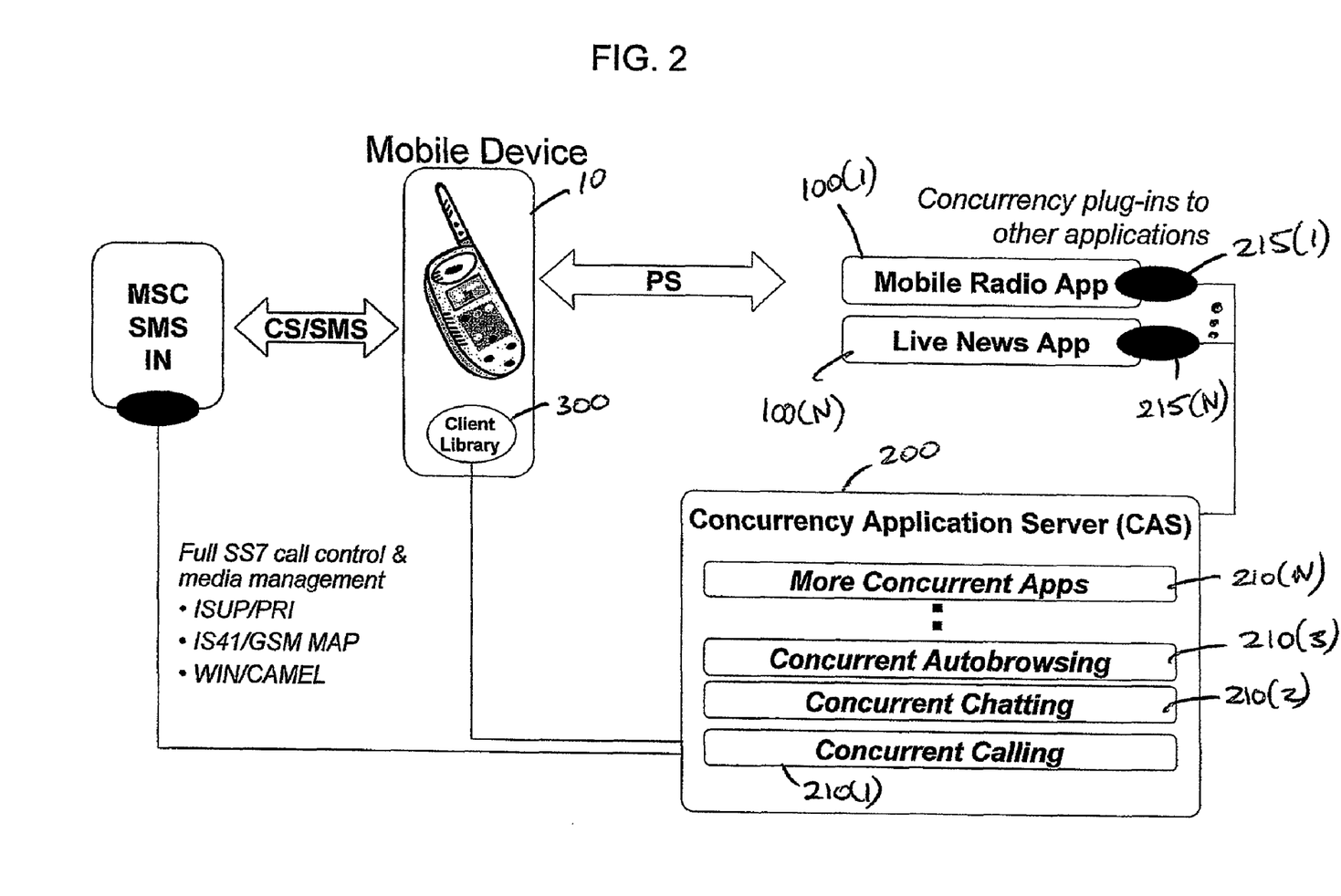
FIG. 2 is a high level data flow diagram showing a content delivery server that communicates with a library component in a mobile device according to the present invention.

Referring first to FIGS. 1 and 2, the system and method for delivering digital content to mobile devices will be described. The mobile communication devices are shown at reference numeral 10(1) to 10(N) and may be cellular phone or other wireless communication devices that have sufficient display and user interface capability beyond simple telephony functions. Such devices are currently available and they have capabilities including mobile web browsing, mobile instant messaging and related capabilities.

As is known in the art, mobile communication devices 10(1)-10(N) achieve a wireless radio communication link via a radio network 20 to base station control centers (BSCs) 30 and the BSCs 30 are in turn connected to a mobile switching center (MSC) 40 that is part of a voice network 50. Also in the voice network 50 is a home location register (HLR) 60 and a multimedia messaging service center/short message service center (MMSC/SMSC) 70 and a voicemail server 80. The MMSC/SMSC 70 handles processing of data messages to/from a mobile communication device. The radio network 20 is also connected to a data or packet network 90 by a GSM gateway serving node (GGSN)/packet data serving node (PDSN)/wireless internet access router 85. Alternatively, multimodal mobile handsets may connect to the IP network via any other available radio technology like WiFi (IEEE 802.11), WiMax (IEEE 802.16) etc. The data network 90 may include content servers 100(1), 100(2) and 100(3) that are accessible via the WWW for digital content.

According to the present invention, a mobile content system is provided that comprises a concurrency application server (CAS) 200 and a small client library 300 also called a concurrency application plug-in that resides in the mobile devices 10(1) to 10(N). The CAS 200 interfaces with equipment in the voice network 50 and equipment in the data network 90, e.g., the Internet. A mobile device 10(i) equipped with the concurrency application plug-in is said to be a concurrency-enabled mobile device. Thus, any currently available or hereinafter developed mobile device having the aforementioned user interface capabilities may be made concurrency-enabled by installing the client library 300 or otherwise configured with the functionality of the client library 300 as described herein. For example, the client library functionality may made part of the operating system of a mobile device.

The CAS 200 comprises an interface function (described hereinafter) that detects incoming calls or communication sessions that may be originate from an MSC or MMSC/SMSC. Depending on which concurrent applications the mobile device user has subscribed, the CAS 200 activates a mobile application. The CAS 200 comprises a plurality of mobile applications 210(1) to 210(N) that can be running concurrently in cooperation with a client library 300 on any number of mobile devices 10. Examples of mobile applications include a voice calling application 210(1), voice mail application 210(2), chatting application 210(3) and auto-browsing application 210(4). Additional mobile applications are described hereinafter. The mobile applications 210(1) to 210(N) may interface with third party applications 110(1) to 110(N) which may include, for example, a mobile radio application 110(1) and a live news application 110(N), as well as a mobile gaming application 120(1). The CAS 200 comprises concurrent application plug-ins 215(1) to 215(M) to enable interaction between the CAS applications and the third party applications.

A concurrent mobile application may be initiated by the CAS 200 as explained above or by the mobile device as well. For example, the client library 300 on the mobile device may activate a mobile application based on an incoming call or certain incoming message notifications. Thus, the mobile device or the CAS 200 may detect the need for concurrency and activate a mobile application concurrent with an already activated mobile application.

The functions of the CAS 200, such as the content delivery functions described herein, may be embodied by one or more computer program instructions that, when executed by computer processor, cause the computer processor to perform the functions that are described herein.

Figure 3:
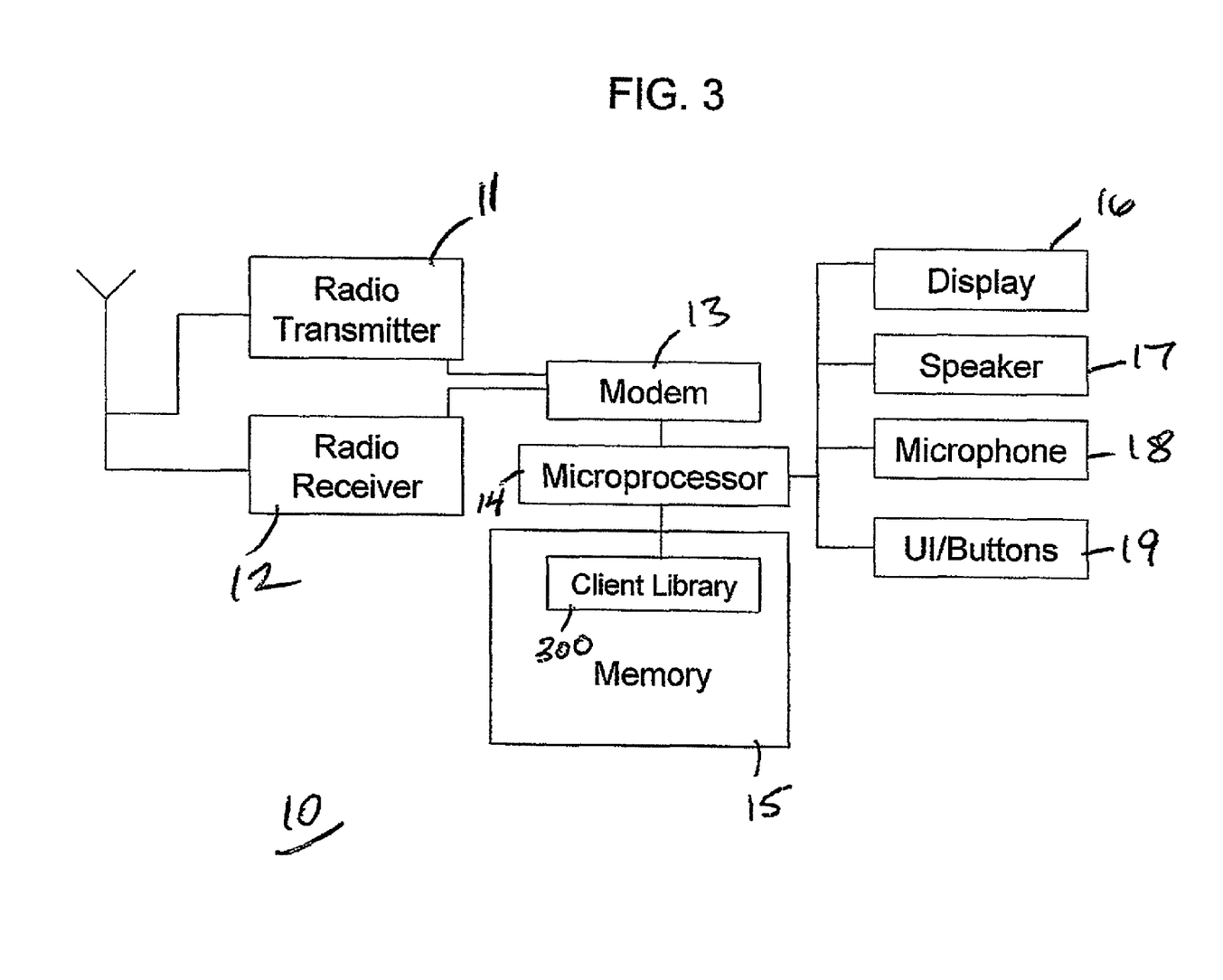
FIG. 3 is a block diagram of the software architecture of the content delivery system according to the present invention.

FIG. 3 illustrates a block diagram of a mobile device 10 according to one embodiment. The mobile device 10 comprises a radio transmitter 11, a radio receiver 12, a modem (baseband signal processor) 13, microprocessor 14, memory 15 and a variety of user interface components such as a display 16, speaker 17, microphone 18 and user interface buttons 19. The functions of many of the components are well known in the art and are therefore not described in detail herein. The client library 300 is installed in the memory 15. In addition to the client library 300, the memory 15 stores other software programs that are executed by the microprocessor 14 to provide the various mobile device functions to the user and coordinate cooperation with the CAS 200. The mobile device 10 need have only one instance each of a radio transmitter 11 and a radio receiver 12 to provide for multiple concurrent mobile applications to the device user. No modification to the hardware of a mobile device is necessary to achieve the concurrent mobile application functionality described herein. Moreover, no modification of the over-the-air communication protocol (between a mobile device and the radio network 20) is necessary to provide the concurrent application functionality described herein.

Figure 4:
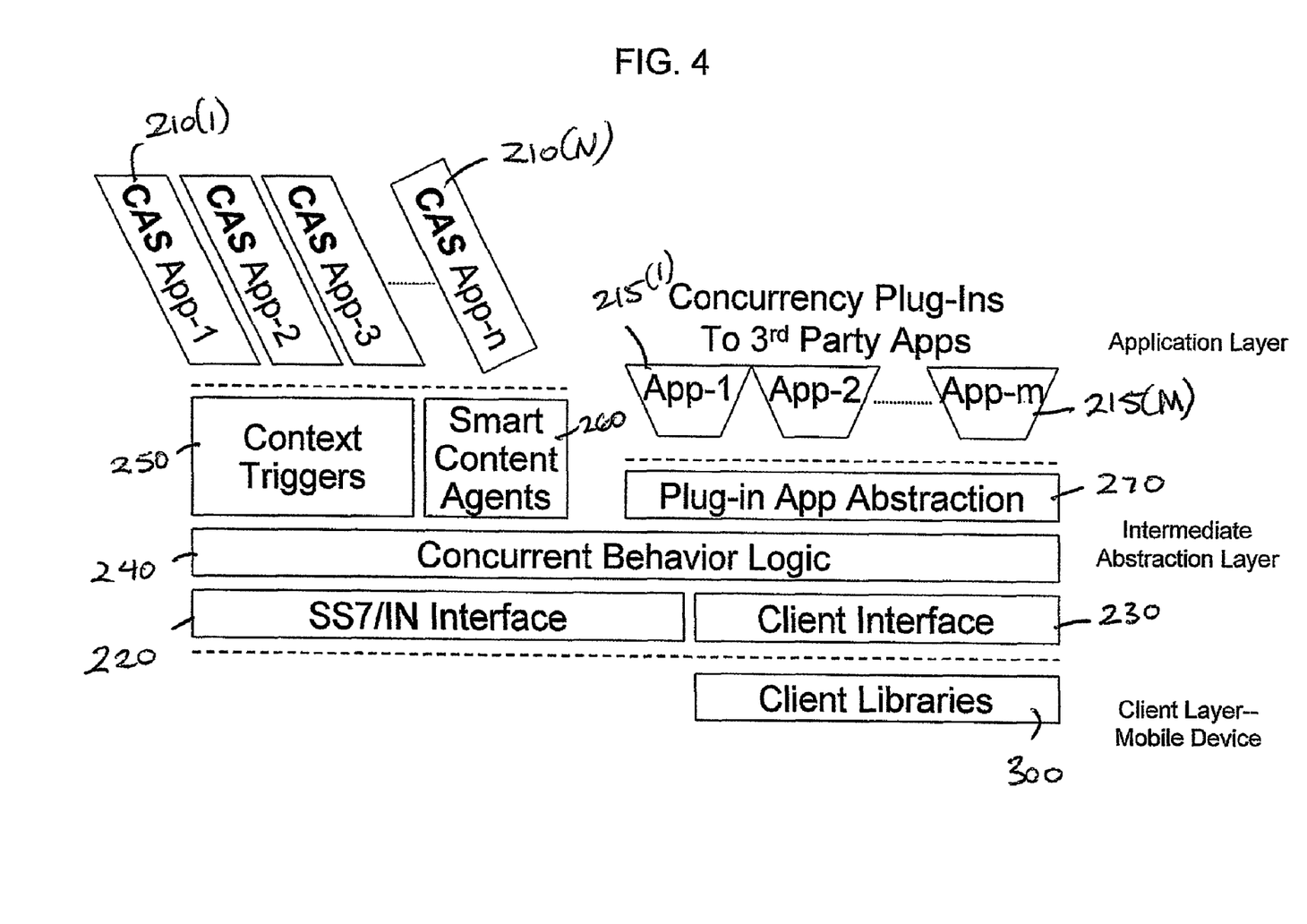
FIG. 4 is a block diagram showing how the content delivery server capability according to the present invention may integrate with the IP Multimedia Subsystem (IMS).

FIG. 4 illustrates an example of a software architecture for the concurrency application system functionality. As mentioned above, at the client layer there is a client library (concurrency application plug-in enabler) 300 that resides in the mobile device 10 that can activate an application while others are already active on the mobile device 10 and can switch an active application between the foreground and background, either in response to a user control or automatically.

At an intermediate abstraction layer there is a SS7/IN interface function 220 and a client interface function 230. The SS7/IN interface function 220 detects call context information from a mobile device call. Call context parameter information includes, but is not limited to, information such as the mobile device ID, telephone number of the mobile device, the number called by the mobile device, etc., obtained from the MSC and location of the mobile device or other information obtained from or via the GGSN/PDSN/WirelessRouter 85. In addition, the client interface function 230 receives any special data from the mobile device 10 and delivers concurrency application information or content to the mobile device 10 in the appropriate format depending on the capabilities of the mobile device. There is also a concurrent behavior logic function 240 that maintains a profile data file for each mobile device 10 as to the types of concurrent applications to be provided to a mobile device and parameters associated with the concurrent application, which applications are active or available on a particular mobile device, etc. Next, there are a context triggers function 250 and a smart content agents function 260. The context trigger function 250 determines what type of concurrent applications should be invoked for a mobile device based on the context of the current activity of the mobile device (type of call made, time of day of the call, location of the mobile device when a call is made, calling number of the call, duration of the call in progress, etc.). Other context triggers may be location based, such as the absolute location of a mobile device user as well as the proximity of one mobile device user to another mobile device user. The location information can be absolute GPS-based or relative RFID-based, technologies for which are known in the art and used or will be used in mobile communication networks and services. The smart content agents function 260 activates one or more concurrent applications to retrieve certain content relevant to the context of a mobile device call, under control of the context trigger function 250.

The appropriate one or more CAS applications (CAS App-1 to CAS App-n) 210(1) to 210(N) are called upon by the context trigger and smart content agents functions 250 and 260. In addition, there is a plug-in application abstraction function 270 that interfaces the concurrent behavior logic function 240 with one or more concurrency application plug-ins 215(1) to 215(M).

Figure 5:
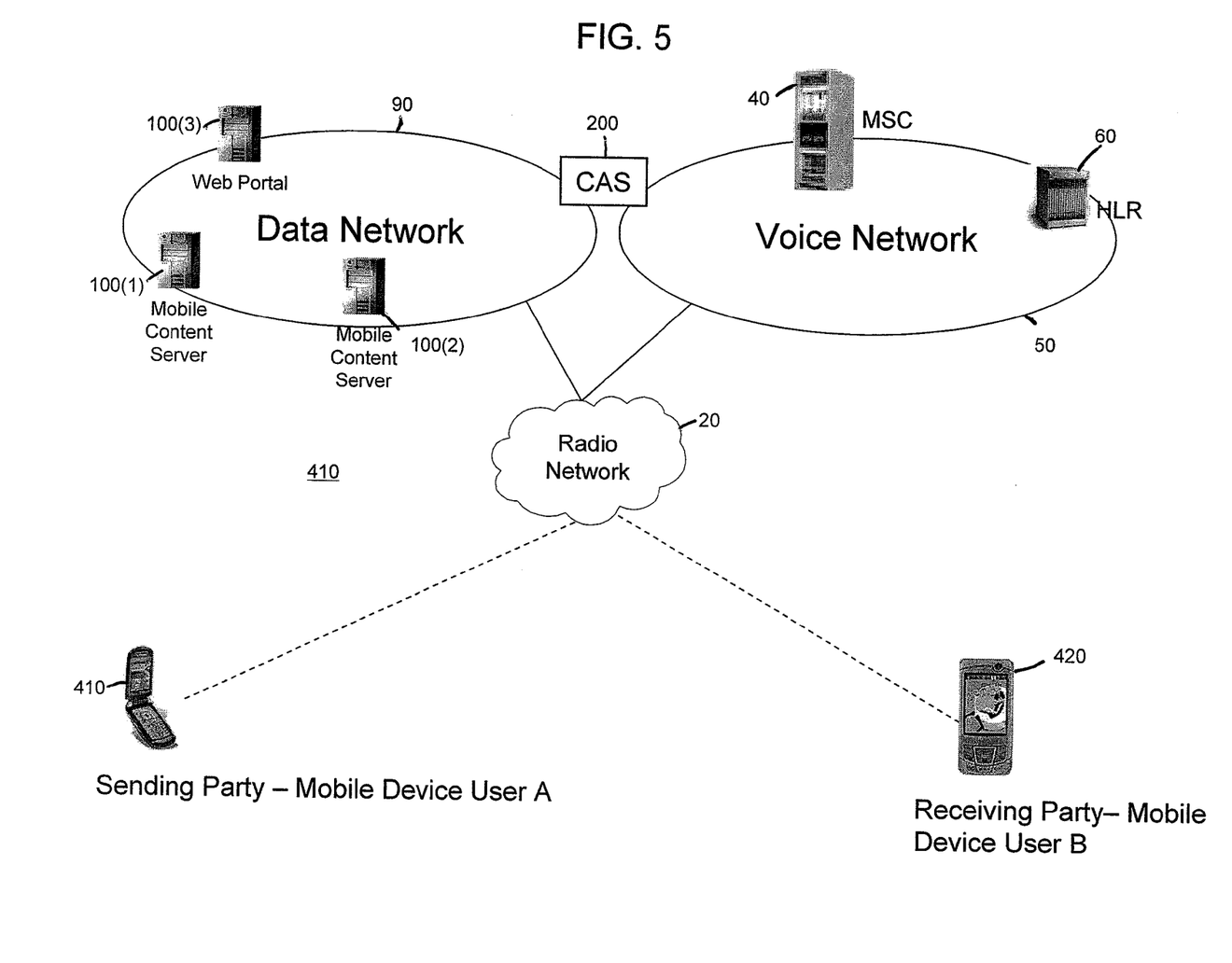
FIG. 5 is a block diagram depicting a media content delivery system and arrangement according to an embodiment on the invention.

Referring to FIG. 5, a system arrangement is shown at reference numeral 400 whereby a mobile device user A with mobile device 410 can send media content to another user B to be activated on user B's mobile device 420 upon receiving a communication contact from A to B. The mobile content is sent from one or more mobile content servers shown at 100(1), 100(2), . . . , a web portal 102 or mobile content from the mobile handset 410 in the course of the communication contact session between mobile device users A and user B. In the examples described hereinafter, user A is referred to as a "sending party" or the initiator of a communication contact and user B is referred to as the "receiving party" or the receiver of a communication contact. In the case of voice call, user A can also be considered the calling party and user B the called party.

The methods described herein are applicable to any media content or media asset, of which a ring tone is only an example. Other examples of media content for which these techniques can be used include (without limitation): digital images (e.g., "wall paper", "photographs"), video (with or without accompanying audio) and audio. The media content items may user-generated (i.e., digital images (wall paper or photographs), videos, audio, etc.) by a user on his/her mobile device (or PC from which it is uploaded to the mobile device or uploaded to a network based server from which it can be accessed via the network by any device with a connectivity to the network) or may be generated by a third party from which the service provider acquires the media content item with the rights to distribute to media device users. Moreover, these media content items may be activated in a mobile device upon a variety of incoming communication contacts including, but not limited to: a voice call, a text message, a video mail message, and an email message.

This system arrangement is capable of accommodating a variety of scenarios, such as (without limitation): (a) User A purchases and gives (gifts) a media content item to user B, optionally with a different pricing plan allowing for the rendering of the media content a fixed number of times or over a fixed period (e.g., activate media content just once, or activate it anytime today); (a) User B chooses to purchase rights to a media content after using it a predetermined number of times (e.g., one); (c) A service provider offers certain media content for free to users in order to seed interest in the mobile device user community; (d) Custom media content created by user A or a third party is transferred to user B, with or without a transaction/license/usage fee. The usage rights associated with a media content item or media asset may be managed using any heretofore known of hereinafter developed digital rights management technology.

Figure 6:
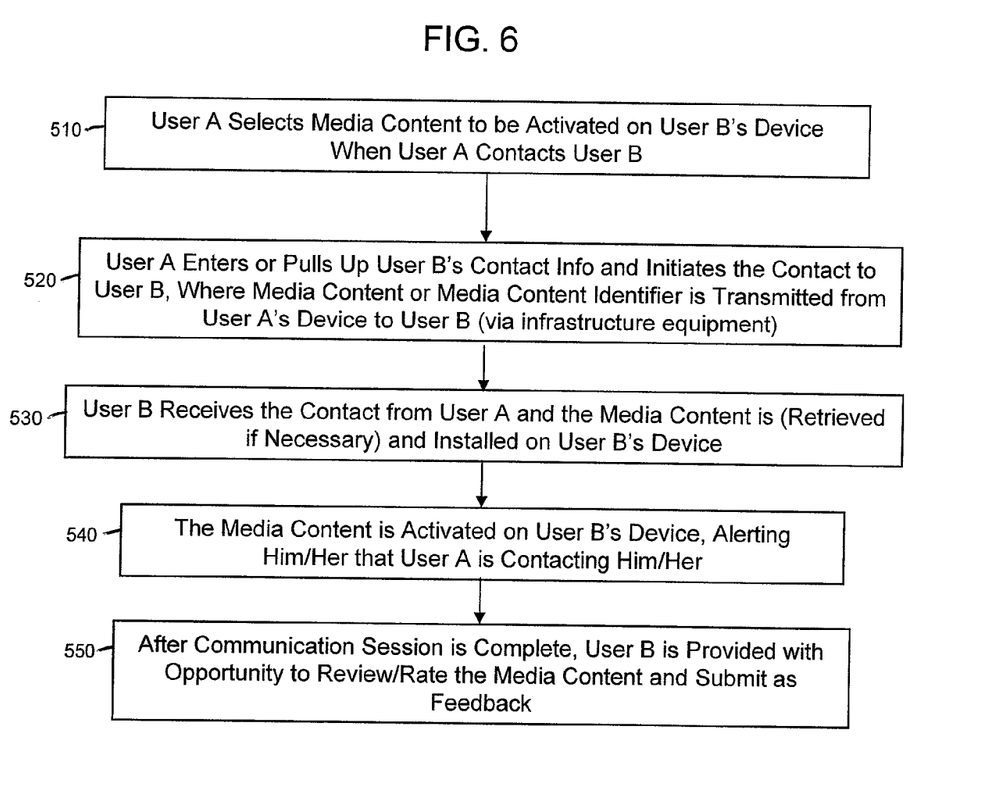
FIGS. 6-9 are flow charts showing media content delivery methods according to embodiments of the invention.

Reference is now made to FIG. 6, with continued reference to FIG. 5. In the example shown in FIG. 6, user A decides to call user B. User A desires that a particular media content item be activated when user B receives the communication contact from user A. At 510, user A selects a particular media content to be activated on user B's device upon user B's device receiving a communication contact from user A. Next, at 520, user A enters/inputs the phone number for user B either manually or by way of any feature on user A's mobile device such as an address book, recent calls, keypad or voice recognition, for example. Also at 520, the media content item selected by user A is transmitted from user A's mobile device to user B's mobile device or if the content already exists on a network server, a symbolic pointer to the content is sent instead. For example, in one embodiment the media content executable for the selected media content item is transmitted from user A's device to user B's device through the various wireless and wired service provider infrastructure. Alternatively, when user A makes the selection of the particular media content item, a link or identifier is associated with the particular media content item other equipment in the infrastructure network transmits the link or identifier to user B's device upon completing the communication contact from user A to user B. The infrastructure equipment (e.g., the content servers) retrieves the particular media content item and transmits it to user B's device. It should be understood that the present invention is not to be limited to any particular order of the functions shown in the flow charts. For example, the first two functions shown in the flow chart may occur in a sequence reverse from that shown in FIG. 6.

At 530, when user B receives the communication contact from user A, the particular media content item also arrives at user B's device (either from user A or retrieved by the infrastructure equipment at user A's initiation) for installation on user B's device. It is to be understood that prior to installing the particular media content item, user B's device may be configured to prompt user B for certain permissions. If user A is a trusted user to user B, there may be no need to prompt user B for permissions. For example, there may be a predetermined community of mobile device users who have elected to participate in a media content sharing/referral community. In each mobile device user in the community may set attributes, such as time of day, location, etc., that establish the trust guidelines. There may also be content restrictions in a user's attributes so that, for example, only mobile content included in a particular mobile network operator's media content deck may be automatically downloaded and installed on user B's device. The content may also have associated rights that will be enforced by the client in a mobile device. For example, the content may be displayed a fixed number of times or may be used within a fixed time period or a combination thereof. After successful installation of the media content on user B's device, at 540 the media content is activated thereby alerting him/her that there is an incoming communication contact from user A. At 550, after the communication session between user A and user B is complete, user B may be provided with a chance to review/rate the media content item and provided feedback information to the service provider. The service provider can use the feedback to recommend new media content that is specific to the tastes of user B as well as to create an average rating for the media content item across the community of users.

Figure 7:
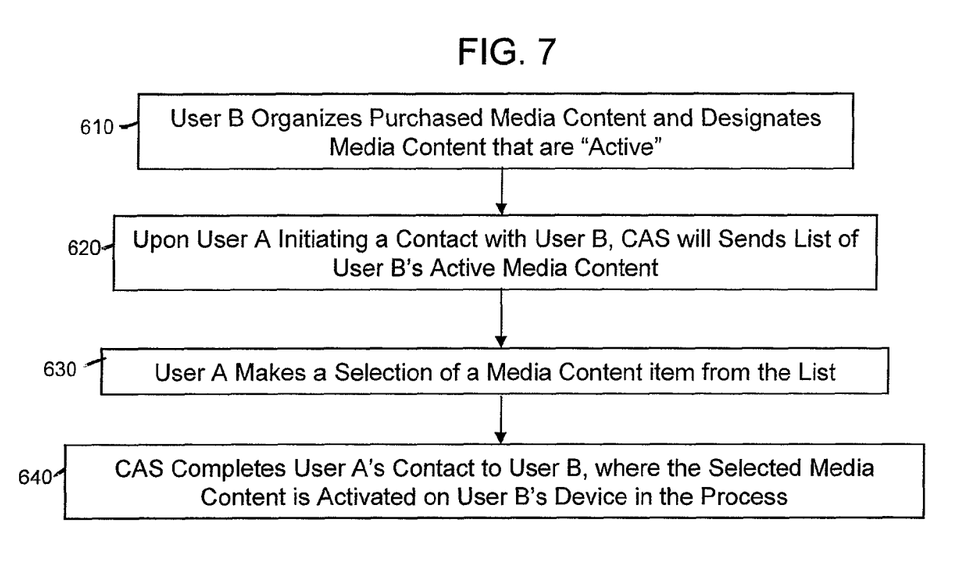

Turning now to FIG. 7, a variation to the scenario depicted in FIG. 6 is described. In this embodiment, the receiving party, user B, may have already purchased a number of media content items through any number of the available mechanisms. User B may desire to share one or more of his/her media content items with a community of users. For example, user B may want to share all of his/her media content items; user B may want to share a subset of his/her media content items; or user B may organize the media content he/she has purchased into sets. For example, sets of media content items may be assigned to: different moods/avatars of the user B (i.e., angry set, happy set, bored set, etc.); and/or current activities that user B is engaged in ("in a meeting", "in a classroom", "at the gym" etc.). User B can modify the sets that he/she has created at any time. At 610, user B is permitted through this service scenario to create an "active" set of media content items that can be used to alert him/her of alerts. Moreover, user B can designate which set of media content items are active on his/her device and can change which set of media content items is active upon receiving a communication contact.

At 620, when any user, e.g., user A, wants to initiate a communication contact to user B, the CAS 200 will detect user A's selection of user B at the beginning of a communication contact initiation session and transmit to user A a list of media content items that B has designated as active on his/her device. At 630, user A then has the opportunity to choose one of the active media content items in the process of preparing to initiate a communication contact to user B. Next, at 640 the CAS 200 or other component in the service network infrastructure, completes user A's communication contact to user B, and in the process the media content item selected by user A is activated on user B's device to alert user B that user A is making contact with him/her. In this exemplary embodiment, the sender, user A, has the ability to customize the media content alert experience for user B.

Figure 8:
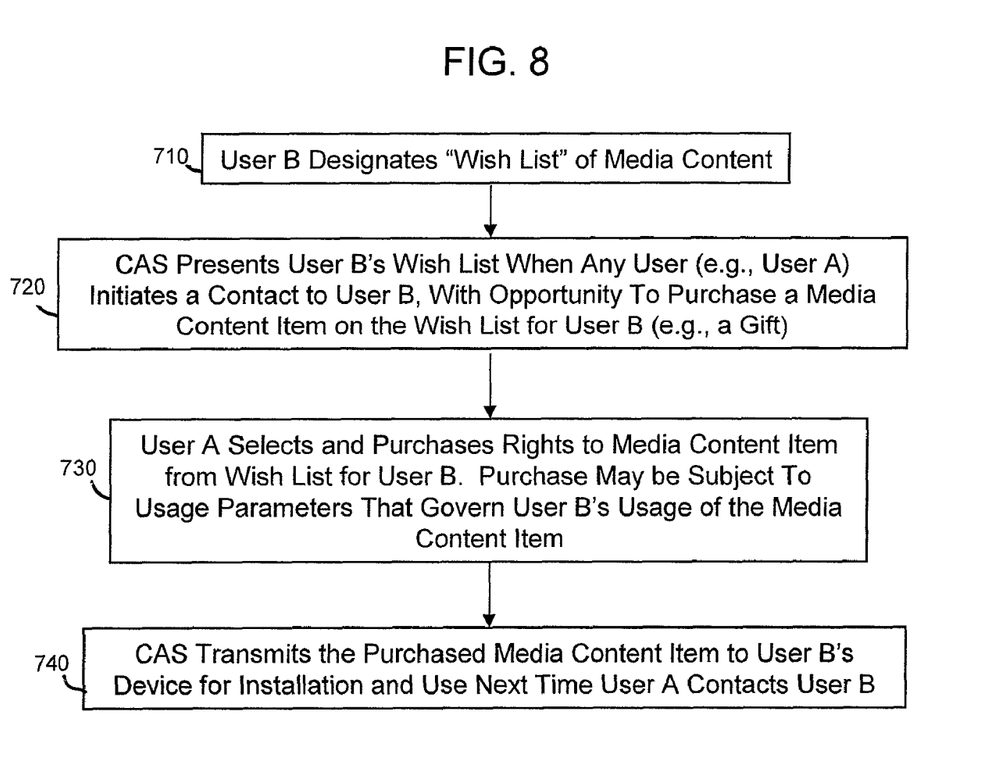

Reference is now made to FIG. 8 in which another exemplary embodiment is described. In this embodiment, at 710, the receiving party, user B, creates a "wish-list" of media content available to user B by the service provider, but for which user B desires (or potentially desires) though user B does not yet have the rights to use. The wish-list may be created in various contexts, including but not limited to:

a. Personal event, i.e. birthday, anniversary etc.
 b. Holidays, i.e. mothers day, independence day etc.
 c. Religious holidays, i.e. Christmas, Hanukkah, etc.

Thus, the CAS 200 stores data pertaining to one or more of these events associated with its subscribed mobile device users, e.g., user B. At the appropriate time according to a calendar of events associated with user B, the CAS 200 sends a notification to user A (with or without a wish list for user B) to present user A with the opportunity to purchase rights as a gift to media content for use by user B in connection with one of these events. In this version of the service, at 720, when a user, user A, initiates a communication contact to user B, the CAS 200 or other service provider component may present user B's wish-list to user A. In so doing, user A is offered the opportunity to purchase one of the media content items from user B's wish-list on behalf of user B and transfer or gift the selected media content item to user B. At 730, when user A selects and purchases rights to a media content item from the wish-list, the CAS 200 may present user A with usage parameters that govern user B's usage of the media content item selected and purchased by user A based on the purchase level. That is, there may be usage tiers that depend on the purchase price, where a higher fee is charged for more flexible usage parameters. For example, the amount of the purchase fee may be used on the number, n, of restrictions placed on the assignment of the media content to another contact in user B's contacts list, ranging for a single contact (e.g., user A) to an unlimited number of contacts whereby user B could assign the media content item to anyone in user B's contact list. Alternatively, user A may specify a list of user identifiers (calling numbers, email addresses, etc.) that user B can associate with the media content item gifted to user B by user A. Still another alternative is where user A specifies a list of user identifiers for which user B cannot associate the gifted media content item. Still another alternative is to allow user B to use the content a predetermined number of times, or over a predetermined time period or a combination thereof. Thus, to summarize, the usage parameters may comprise one or more of: the number of activations of the selected media content item on the second mobile device, extent to which the selected media content item may be activated on the second mobile device apart from receiving a communication contact from the first mobile device, a time duration for which activation of the media content item is permitted, a combination of the number of activations and time duration for which activation may occur, and extent to which the selected media content item may be transferred from the second mobile device to another mobile device.

Finally, at 740, the CAS 200 or other component in the service provider network transmits the purchased media content item to user B's device for installation and activation optionally with rights and restrictions the next time user A (or any other user that user A or user B assigns to that media content item based on the usage parameters) contacts user B.

Figure 9:
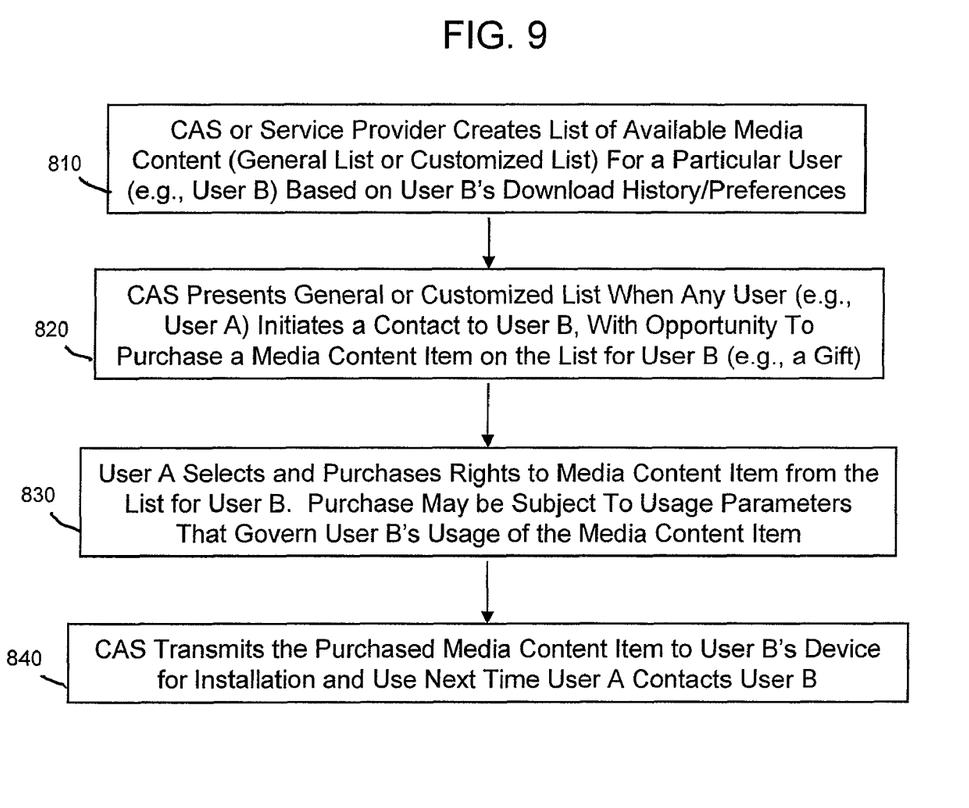

Turning to FIG. 9, still another variation to the methods described above is provided. In this embodiment, at 910, the CAS 200 or service provider creates a list of available media content that any user, e.g., user A, can select and use to alert the receiving party, e.g., user B. At 920, the CAS 200 or service provider may create a general list of available media content or a customized list for user B based on the history of the types of media content items user B has purchased or received as a gift from another user or based on ratings/review feedback that user B has provided for media content items that user B has experienced. The CAS 200 or service provider may make some of the media content items available free to seed interest in this service. The flow at 820, 830 and 840 for this embodiment is similar to the flow at 720, 730 and 740 of the wish-list case embodiment shown in FIG. 8, except that the list is created by the CAS 200 or service provider.

Possible Implementation Scenarios

Figure 10:
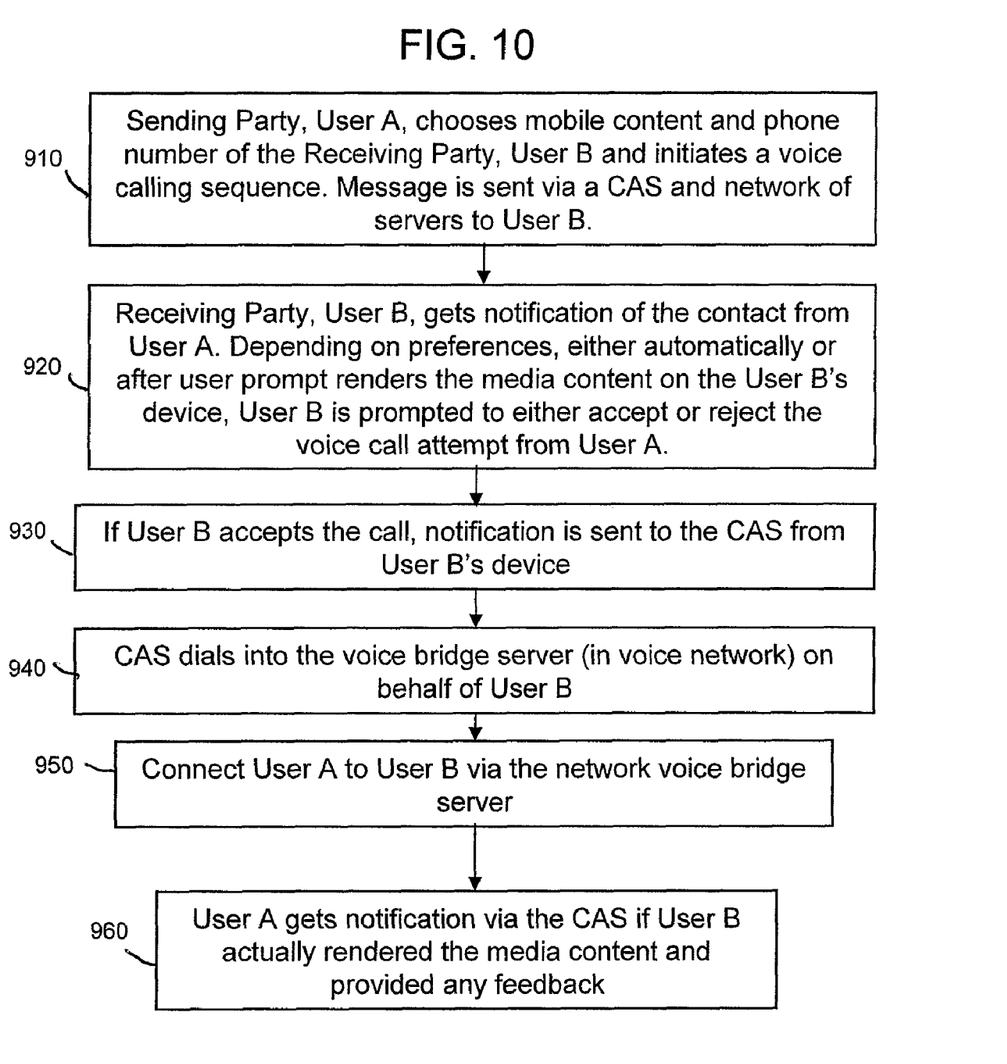
FIG. 10 is a flow chart showing one implementation for the media content delivery method according to an embodiment of the invention.

The system and methods described above in connection with FIGS. 5-9 may be implemented in numerous ways. With reference to FIG. 10, the following describes some possible implementation scenarios for various stages of the communication contacts and transactions occurring between one user, user A and another user, user B.

At 910, when user A selects a media content item to send to user B, this may be achieved with the client library 300 in user A's mobile device, where the client library 300 interfaces with the CAS 200 to enable user A to make the media content selection from a list of available media content items transmitted to user A by the CAS 200 or from a media content item already installed on user A's mobile device. Again, user A can identify user B prior to initiating a communication contact using any mechanism on user A's device, such as a keypad, voice recognition, etc.

When a media content item is transmitted to user B's device, the CAS 200 may transmit the media content item to the client library 300 in user B's device. At 920, user B's mobile device may present notification to user B of the contact from user A. User B's mobile device can be configured to automatically download the content, or only after prompting user B to accept or reject the call, and user B responds with an accept response on his/her mobile device. The client library on user B's device handles/supervises the download of the media content and automatically assigns it to user A (for activation or alerting user B when contacted by user A) in user's B's contacts list or address book. Assignment of the media content item in user B's device may be achieved in any of several ways, including but not limited to:

1. Adding user A to user B's contact list if user A is not already listed, and assigning (associating) the media content item to user A while possibly continuing to store any prior assignments made to user A that may have existed in user B's contact list.
2. Assigning the media content item as a default for all incoming communication contacts while possibly continuing to store any prior assignments that user B has made. This may be desirable particularly if the media content item has usage parameters associated it that restrict the number of activations on user B's device that are not tied to an incoming communication contact from user A.

After a successful installation of a media content item on user B's mobile device, the client library in user B's device transmits a message to the CAS 200 that indicates that successful installation has occurred.

If the call is a voice call and user B accepts the call from user A, then at 930 user B's mobile device transmits a notification to the CAS 200. At 940, the CAS 200 dials into a voice network bridge server and at 950 connects user A to user B via the voice network bridge to allow user A and user B to carry on a voice call.

As an alternative, the CAS 200 may connect user A into a conference bridge service at the time, or after, user A has selected a media content item for user B.

At the end of the communication session between user A and user B, the client library on user B's device may prompt user B to provide feedback rating/review on the media content, as described above, so that the service provider can identify other media content items to recommend to user B. At this time, the usage parameters of the newly installed media content item on user B's device may be used to notify user B that he/she must purchase additional rights to continue using the media content item (or to expand his/her usage of the media content item). If user B does not wish to purchase the media content item, then the client library in user B's device will reinstate the prior assigned media content item to user A (or a default media content item) in user B's device.

At 960, user A may receive notification from the CAS 200 or other entity indicating whether user B actually installed and rendered the media content on his/her mobile device, together with information concerning user B's feedback of the media content item (e.g., user B liked it, user B did not like it, etc.).

The system, device and methods described herein may be embodied in other specific forms without departing from the spirit or essential characteristics thereof. The foregoing embodiments are therefore to be considered in all respects illustrative and not meant to be limiting.

What is claimed is:

1. A method for delivering media content to a mobile communication device, comprising:

selecting, at a first mobile device, a media content item for use on a second mobile device upon the second mobile device receiving a communication contact from the first mobile device;

selecting, at the first mobile device, usage parameters associated with the selected media content item;

engaging, at the first mobile device, in a first transaction to purchase rights to the selected media content item for installation and use on the second mobile device, wherein a purchase price for the rights is dependent on the selected usage parameters;

initiating, at the first mobile device, the communication contact to the second mobile device to cause the selected media content item to be transmitted to the second mobile device in the course of establishing the communication contact to the second mobile device;

receiving, at the second mobile device the communication contact from the first mobile device together with information identifying the selected media content item;

installing, at the second mobile device, the selected media content item if it is not already installed on the second mobile device; and associating, at the second mobile device, the selected media content item with an identifier of said first mobile device so as to activate the selected media content item.

2. The method of claim 1, wherein said associating comprises associating the selected media content item at the second mobile device without user action at the second mobile device.

3. The method of claim 1, wherein selecting usage parameters comprises selecting one or more of: the number of activations of the selected media content item on the second mobile device, an extent to which the selected media content item may be activated on the second mobile device apart from receiving a communication contact from the first mobile device, a time duration for which activation of the media content item is permitted, a combination of the number of activations and time duration for which activation may occur, and an extent to which the selected media content item may be transferred from the second mobile device to another mobile device.

4. The method of claim 3, further comprising:

engaging, at the second mobile device, in a second transaction to purchase rights to expand the usage parameters of the selected media content item.

5. The method of claim 1, further comprising:

receiving, at the first mobile device, a list of available media content items, wherein the selected media content item is selected from said list.

6. The method of claim 5, further comprising:

creating, at said second mobile device, a wish list of media content items that a user of said second mobile device wishes to acquire but has not already acquired and installed on the second mobile device; and receiving, at the first mobile device, said wish list, wherein the selected media content item is selected at the first media device from said wish list.

7. The method of claim 5, further comprising:

creating the list of available media content items based on user preference information derived from other media content items that have been installed on the second mobile device.

8. The method of claim 5, wherein receiving the list of available media content items at the first mobile device comprises:

receiving the list of available media content items from a service provider either as a promotion or part of the services provided by the service provider to the first and second mobile devices.

9. The method of claim 1, further comprising
receiving, at the first mobile device, a list of media content items already installed on the second mobile device,
wherein said selecting the selected media content item at the first mobile device comprises selecting a media content item from the list.

10. The method of claim 1, further comprising:
activating, at the second mobile device, the selected media content item upon receiving the new communication contact from the first mobile device.

11. The method of claim 1, further comprising:
establishing a voice call between the first mobile device and the second mobile device through a voice network apparatus upon a user of the second mobile device accepting the new communication contact from the first mobile device.

12. The method of claim 1, wherein the purchase of the rights to the selected media content item corresponds to a gift made to a user of the second mobile device.

13. The method of claim 1, further comprising:
storing, at a computing device, data pertaining to one or more events associated with a user of the second mobile device; and
sending a notification to the first mobile device to provide a user of the first mobile device with an opportunity to select a media content item and purchase rights to the selected media content item for the user of the second mobile device as a gift in connection with said one or more events.

14. A system that coordinates delivery of media content to mobile communication devices, comprising:
a. first and second mobile devices each configured to activate media content in response to receiving a communication contact from another mobile device; and
b. a computing device that is in communication with said first and second devices, wherein the computing device transmits to the first mobile device a list of media content items that can be activated on the second mobile device when the second mobile device receives a communication contact from the first mobile device, and the computing device receives from the first mobile device an indication of a selected media content item from the list and transmits to the second mobile device in the course of the communication contact to the second mobile device for association in the second mobile device with an identifier of the first mobile device for activation of said selected media content item on said second mobile device upon receiving the communication contact from the first mobile device thereafter.

15. The system of claim 14, wherein the computing device transmits to said first mobile device a list of media content items that the user of the second mobile device wishes to acquire but has not already acquired, and wherein the computing device receives the indication of the selected media content from the wish list.

16. The system of claim 14, wherein the computing device generates the list of media content items based on user preference information derived from other media content items that have been installed on the second mobile device.

17. The system of claim 14, wherein the computing device generates the list of media content items based on media content items already installed on the second mobile device.

18. The system of claim 14, wherein the computing device stores data pertaining to one or more events associated with a user of the second mobile device and sends a notification to the first mobile device to provide a user of the first mobile device with an opportunity to select a media content item and purchase rights to the selected media content item for use by the user of the second mobile device as a gift to the user of the second mobile device in connection with said one or more events.

19. An article of manufacture for delivering media content to a mobile communication device, the article of manufacture comprising a non-transitory computer-readable medium holding computer-executable instructions for performing a method comprising:
selecting, at a first mobile device, a media content item for use on a second mobile device upon the second mobile device receiving a communication contact from the first mobile device;
selecting, at the first mobile device, usage parameters associated with the selected media content item;
engaging, at the first mobile device, in a first transaction to purchase rights to the selected media content item for installation and use on the second mobile device, wherein a purchase price for the rights is dependent on the selected usage parameters;
initiating, at the first mobile device, the communication contact to the second mobile device to cause the selected media content item to be transmitted to the second mobile device in the course of establishing the communication contact to the second mobile device;
receiving, at the second mobile device the communication contact from the first mobile device together with information identifying the selected media content item;
installing, at the second mobile device, the selected media content item if it is not already installed on the second mobile device; and
associating, at the second mobile device, the selected media content item with an identifier of said first mobile device so as to activate the selected media content item.

20. The article of manufacture of claim 19, wherein said associating comprises associating the selected media content item at the second mobile device without user action at the second mobile device.

21. The article of manufacture of claim 19, wherein selecting usage parameters comprises selecting one or more of: the number of activations of the selected media content item on the second mobile device, an extent to which the selected media content item may be activated on the second mobile device apart from receiving a communication contact from the first mobile device, a time duration for which activation of the media content item is permitted, a combination of the number of activations and time duration for which activation may occur, and an extent to which the selected media content item may be transferred from the second mobile device to another mobile device.

22. The article of manufacture of claim 20, wherein the instructions for performing the method further comprise:
engaging, at the second mobile device, in a second transaction to purchase rights to expand the usage parameters of the selected media content item.

23. The article of manufacture of claim 19, wherein the instructions for performing the method further comprise:
receiving, at the first mobile device, a list of available media content items, and
wherein the selected media content item is selected from said list.

24. The article of manufacture of claim 22, wherein the instructions for performing the method further comprise:
creating, at said second mobile device, a wish list of media content items that a user of said second mobile device wishes to acquire but has not already acquired and installed on the second mobile device; and receiving, at the first mobile device, said wish list, wherein the selected media content item is selected at the first media device from said wish list.

25. The article of manufacture of claim 22, wherein the instructions for performing the method further comprise:

creating the list of available media content items based on user preference information derived from other media content items that have been installed on the second mobile device.

* * * * *